May 15, 1923.
A. OVERBEEK
HELICOPTER
Filed Dec. 1, 1921
3 Sheets-Sheet 1
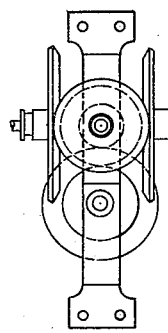
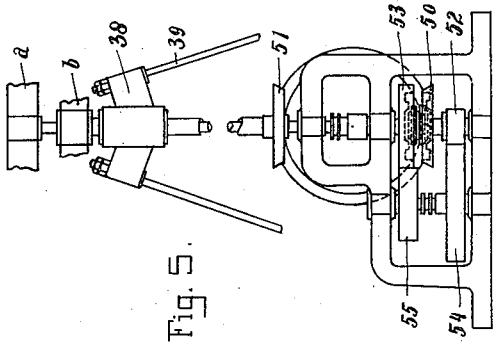
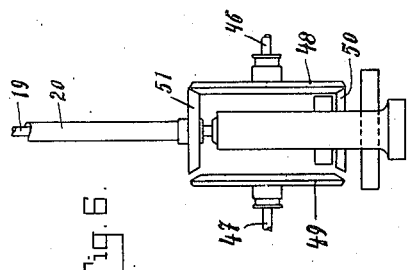
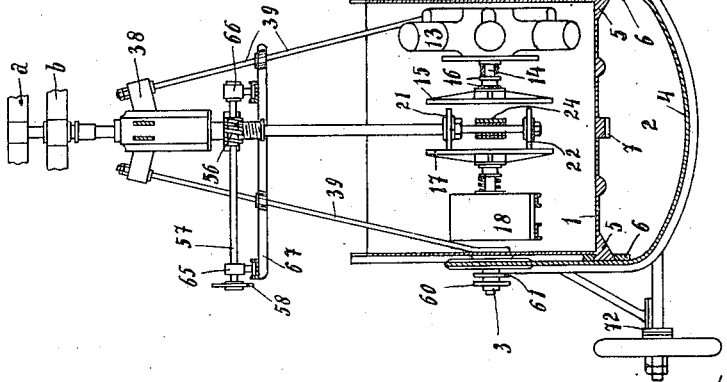
Inventor
ALBERTUS OVERBEEK.
Per
Attorneys.

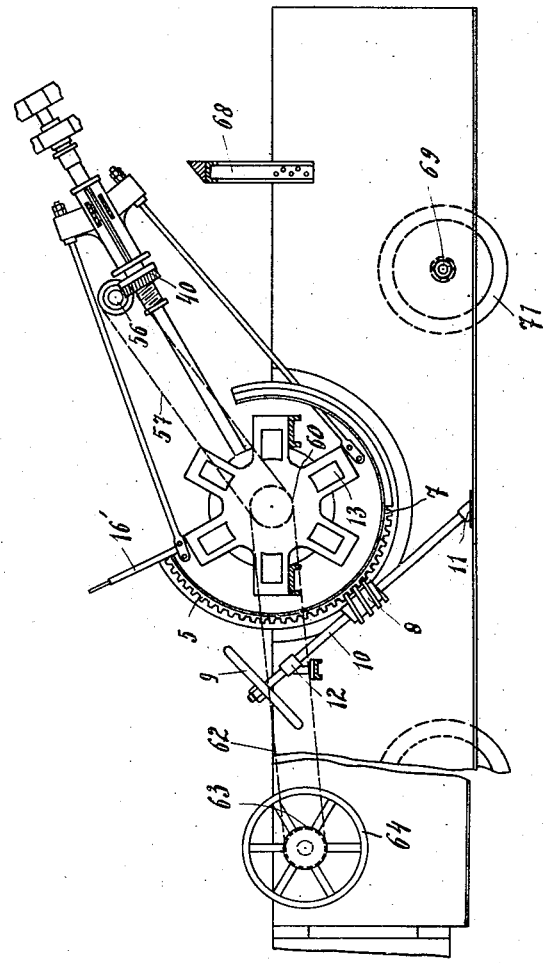

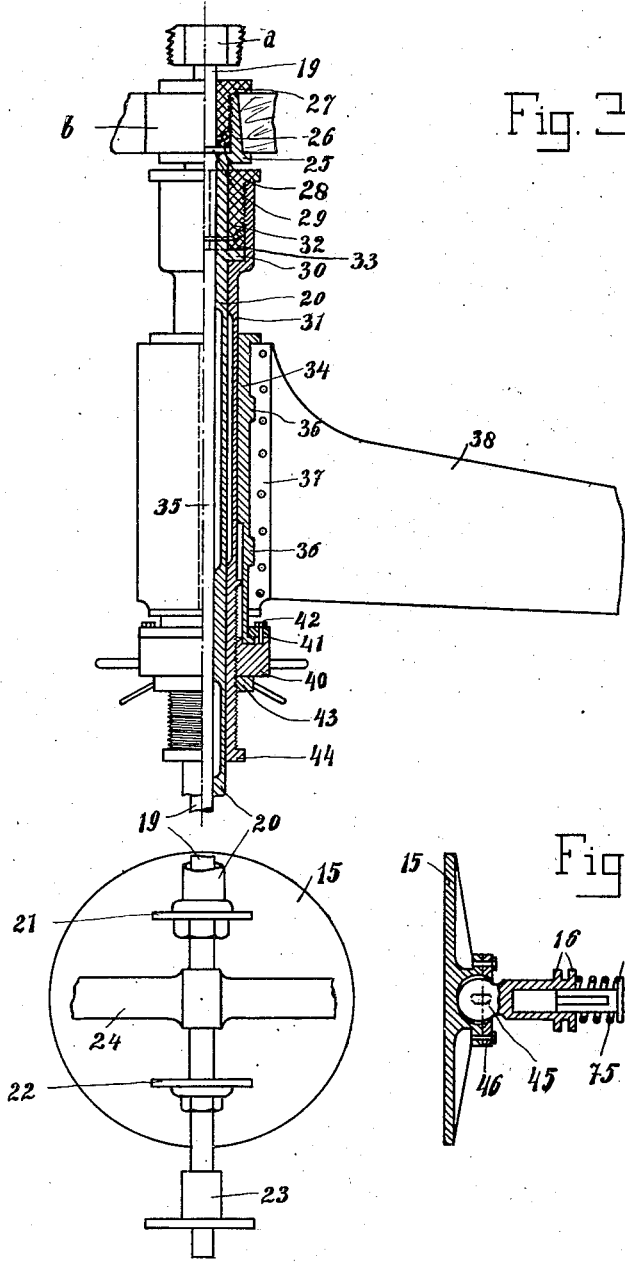

Patented May 15, 1923.

1,455,352

UNITED STATES PATENT OFFICE.

ALBERTUS OVERBEEK, OF WELTEVREDEN, JAVA, DUTCH EAST INDIES.

HELICOPTER.

Application filed December 1, 1921. Serial No. 519,116.

*To all whom it may concern:*

Be it known that I, ALBERTUS OVERBEEK, a citizen of the Dutch East Indies, and resident of Weltevreden, Java, Dutch East Indies, have invented certain new and useful Improvements in a Helicopter, of which the following is specification.

The invention relates to a helicopter with two propellers rotatable in opposite direction and particularly to the transmitting gear between motors and propellers.

It has been proved necessary with aerial machines of this kind to provide means for preventing the turning of the machine about its vertical axis which is caused by the action of the propellers. Hitherto this has been overcome by means of the rudders, but this absorbs much power.

According to this invention the solution of the question is accomplished by driving each of the propellers with a different speed and in such a way that the resistance of the air met during the rotation is equal.

This can be attained by connecting the propellers so that they can be adjusted simultaneously to the desired speed.

According to the invention the propellers are for this purpose arranged on concentric shafts, which are provided at their lower ends with friction discs, which cooperate with one or more motor driven discs.

The adjustment of the propellers is effected by means of an adjustable nut, arranged in the frame of the propeller shafts, which nut co-acts with a screwthreaded part of the outer hollow shaft, the latter acting on the inner propeller shaft for instance by means of a collar fixed on the same.

To propel the helicopter in a forward direction, the center of gravity of the helicopter-hull must be put more to the bow, by moving a special weight adjusted in or under the hindpart of the hull, or by shifting to the front of any movable load and passenger-seats inside the hull, after this the whole gear must be adjusted in an inclined position, for which purpose the gear is arranged in a casing, rotatably mounted about a horizontal axis in the hull and guided in separated guides therein, and which housing can be locked or held in any desired position. By putting the centre of gravity more to the hindpart of the hull, the helicopter moving in forward direction can be stopped quickly.

In the drawings, which show by way of illustration an embodiment of the invention:

Fig. 1 is a part vertical section of a helicopter, the propellers being omitted.

Fig. 2 is a side view of the gear for adjusting and driving the propellers, one side of the hull being broken away.

Fig. 3 shows a larger scale, a part longitudinal section of the propeller shafts and driving gear.

Fig. 4 is a vertical section of the motor friction disk and Figs. 5, 6 and 7 are side, front and plan views respectively of another form of construction, of the driving gear for the propellers.

The helicopter is of the type having two propellers $a$ and $b$ rotating in opposite direction. The whole transmitting gear to adjust and drive the propellers is arranged in a cylindrical casing 1, which is rotatable about hollow journals 3, mounted in the hull 4 of the aerial machines and carried by dovetailed flanges 5 in guides 6 of the hull.

It is also possible to adjust the motors in or upon the hull and to make pivotable only the frame connected with the transmitting gear and propellers about hollow journals mounted in the hull. The centre of these hollow journals must correspond with the centre of the friction axles (or bevel wheels) turned by the motors.

The casing 1 is provided in the middle with a toothed sector 7, with which a worm 8 meshes. This worm is fixed on an axle 10 with handwheel 9, which axle rests in bearings 11 and 12, attached to iron frames of the hull 4. The hollow journals 3 are as exactly as possible placed above the centre of gravity of the hull. Between the bottom of the housing 1 and the hull is a space 2, which may be preferably used to store fuel, water and accumulators for driving the reserve electrical motor 18.

For the normal driving of the propellers, an internal combustion motor 13 having six radially disposed cylinders, or a motor of other suitable type is provided which may be fixed in any suitable manner in the housing 1. The crankshaft 14 of the motor 13 extends to the innerside of the housing and on this end is provided a friction-disc 15 actuated by a lever 16' held by a forked end between two collars 16 on the hollow box of a clutch.

This box is slidably but not rotatably mounted on the crankshaft 14 and locked by means of a key (Fig. 4). The friction disc is pressed inwardly by means of a spring 75, bearing with its other end against a collar 76 on the crankshaft. These levers 16' are preferably arranged in such a manner that in the vertical position of the transmitting gear the levers extend horizontally, so that same are always easy to actuate opposite this friction-disk 15 is mounted a similar disc 17 which is similarly connected with the reserve electrical motor 18 and can be actuated in a similar manner.

Besides the arrangement of a combustion and an electrical motor, can be mounted two combustion motors, and when they cooperate, only half the force of each motor is needed as compared with their normal working capacity.

So as to ensure uniform pressure of the disks 15 and 17 on the friction discs 21 and 22, the end of the clutch box is spherically shaped and provided with a ball 45, which fits in a corresponding socket on the disc bearing. The spherical end or ball 45 is fixed in this bearing by a divided ring 46. The friction-discs 21 and 22 are pushed from below along a portion of the respective shafts, which are of less diameter, and locked thereon by a nut. It is obvious that the discs can be fixed in any other suitable way.

The propellers a and b, rotating in opposite direction are as already mentioned, mounted on concentric shafts 19 and 20 (Fig. 3) provided at their lower ends with discs 22 and 21, arranged between and adapted to cooperate with one of the discs or with both.

The shafts 19 (Fig. 3) extends downwardly and is supported in a bearing 23 of the housing 1. Between the two friction-discs 21 and 22 is another bearing 24 adapted to guide the shaft 19, which bearing is connected by suitable means to the casing. It is possible to omit the bearing 23 as indicated in Fig. 1. The shaft 19 can also slide in this bearing. The upper end of the outer hollow shaft 20 of the propeller b has its wall rectangular and bent outwardly to form a flange or collar 25, on which collar a perpendicular flange 26 is provided to form a cup (Fig. 3); on said flange 26 the propeller b is fitted in any suitable manner. In the cup thus formed, a ball-bearing is mounted consisting of a bottom ring 28 with an upper gland 27, between which ring and gland the balls are arranged. The bottom ring 28 bears on a flange 29 of the inner massive shaft 19 of the upper propeller a. This flange 29 bears on a horizontal flange 25 of the hollow shaft, while the upper gland 27 is screwed in the upstanding collar 26.

The hollow shaft 20 bears in the same manner as the inner-shaft bears in the outer, with a collar 30 in the cup of the box 31, while in this cup in the same manner a ball bearing is mounted, the upper gland 32 of which is divided and screwed in the upstanding edge of the cup.

The bottom ring 33 of this ball-bearing is also divided. In order to make possible the mounting of the parts and to avoid divided rings and glands, the collar 30 must be screwed on the hollow shaft. The box 32 is slidably but not rotatably mounted in a sleeve 34 and locked by means of key 35. This sleeve 34 is also divided and is fixed with studs 36 in a strut 37 of the frame 38, the latter being provided with lugs, through which the frame columns 39 extend and are attached by their lower ends to the casing. The hollow box 31 has a screw-threaded part at its lower end, along which a nut is movable, the latter being rotatably suspended by a ring 41 and bolts 42 on a flange of the sleeve 34. The hollow box 31 is prevented from backward rotation by a locknut 43. By rotating the nut 40, the box 31 and through it the shafts of the propellers are adjusted up and down. A flange 44 is screwed at the underend of the box 31 for strengthening purposes.

To adjust the speed of the propellers during running, the outer edge of the nut 40 (Figs. 1 and 2) is provided with worm-teeth, in which engages a worm 56 fixed on an axle 57 with a chain wheel 58. This chain wheel is connected by a chain 59 to a chainwheel 60, mounted on the same axle as a chain wheel 61 this axle being held in a casing in any suitable manner. Chain-wheel 61 is actuated by a chain 62, chain wheel 63 and hand wheel 64. By actuating the hand wheel 64 it is possible to actuate the nut 40 and to adjust the friction discs 21 and 22.

As the nut 40 is controlled by a worm the lock-nut can be omitted. The axle 57 of the worm 56 is journalled in two bearings 65 and 66 carried by a cross member 67 clamped to the columns 39.

In Figs. 5, 6 and 7 a form of construction of the gear is illustrated which consists of toothed and bevel gear.

The proportion of the respective numbers of rotation of each propeller must be determined by means of experiments previously made with help of the friction gear. (Figs. 1-4).

Referring to Figs. 5 to 7, the hollow shaft 20 of the lower propeller is driven through the medium of the bevel wheel 51 from the bevel wheel 48 (or 49) on the motor shaft 46 (or 47); and the bevel wheel 50 is mounted independently of the shaft 19 of the upper propeller and has a spur wheel 52 adapted to rotate therewith. Freely mounted upon the said shaft 19 is a gear wheel 53 in mesh with a wheel 55 fixed upon the same shaft as another wheel 54 which latter is thus rotated simultaneously with the wheels 53, 55 and which meshes with the said spur wheel 52. Between the bevel wheel 50 and the wheel 53 a sliding clutch member is keyed on the shaft 19 (see particularly Fig. 5), and is adapted to frictionally engage either the bevel wheel 50 or the wheel 53 so that the rotary motion of the bevel wheel 48 (or 49) is transmitted to the propeller shaft 19 either directly through the friction clutch device from the wheel 50 or through the said friction clutch device and through the wheels 53, 55, 54 and 52 to the said wheel 50, in the latter case the wheel 53 rotating idly upon the shaft 19. It will thus be seen that whilst the wheels 50, 53 are rotated constantly at different speeds the propeller shaft 19 may be coupled up to one or the other so as to vary the speed of the upper propeller relatively to that of the lower propeller, whose speed remains constant.

In the hull is provided a stop 68 to limit the deflection of the transmitting gear from the vertical position.

The hull of the helicopter is carried by two shafts 60 and 70, to which the landing wheels 71 are attached; to prevent the wheels rotating too easily wihch is objectionable for starting on a slope, these shafts are provided with friction discs 72, which cooperate with the friction discs 73 of the landing wheels. By pressing those discs more or less together by means of nuts 74, the friction of the wheels on the shaft can be controlled.

A usual brake construction can also be employed.

As it is obvious that, the motors, friction discs, etc., can also be arranged in the axial direction of the hull.

Having now fully described my invention, what I claim is:

1. In a helicopter having two propellers rotating in opposite direction and arranged one above the other on concentric shafts for giving the hull ascending as well as horizontal propelling movement, friction discs mounted directly on the propeller shafts, a single friction disc for engaging and driving the discs on the said shafts, means for adjusting the relative positions of the discs during the rotation to vary their relative speeds, and means whereby the propeller shafts can be inclined in the forward and the rearward direction of the apparatus.

2. In a helicopter as claimed in claim 1, means for the adjustment of the speed of the propellers comprising a sliding sleeve connected with the propeller frame and carrying hollow concentric shafts, and a rotatable nut mounted on the sleeve for operating same.

3. In a helicopter as claimed in claim 2, outer worm teeth on the rotatable nut, a worm-wheel engaging said teeth, and mechanism mounted in the hull for operating said worm-wheel.

4. In a helicopter as claimed in claim 1, a casing enclosing the driving gear, and mounted in the hull so as to move about a horizontal axis, and means for holding the casing in adjusted position.

In testimony whereof, I have signed my name to this specification in the presence of two subscribing witnesses.

ALBERTUS OVERBEEK.

Witnesses:
R. H. TOMPKINS,
MILLARD L. THOMAS.